United States Patent
Kim et al.

(12)

(10) Patent No.: US 10,486,826 B2
(45) Date of Patent: Nov. 26, 2019

(54) FLIGHT MANAGEMENT SYSTEM HAVING CUSTOMIZED PERFORMANCE DATABASE

(71) Applicant: The Boeing Company, Chicago, IL (US)

(72) Inventors: Geun Il Kim, Woodinville, WA (US); Roy S. Alcantara, Seattle, WA (US); Monica S. Alcabin, Seattle, WA (US); Steven J. Moskalik, Seattle, WA (US); Richard A. Herald, Lynnwood, WA (US); Caroline Klein, Bothell, WA (US)

(73) Assignee: The Boeing Company, Chicago, IL (US)

( * ) Notice: Subject to any disclaimer, the term of this patent is extended or adjusted under 35 U.S.C. 154(b) by 107 days.

(21) Appl. No.: 15/685,147

(22) Filed: Aug. 24, 2017

(65) Prior Publication Data

US 2019/0061971 A1 Feb. 28, 2019

(51) Int. Cl.
*B64D 43/02* (2006.01)
*G08G 5/00* (2006.01)
*G07C 5/08* (2006.01)

(52) U.S. Cl.
CPC ............. *B64D 43/02* (2013.01); *G07C 5/085* (2013.01); *G07C 5/0825* (2013.01); *G08G 5/003* (2013.01); *G08G 5/0021* (2013.01); *G08G 5/0052* (2013.01); *G08G 5/0034* (2013.01)

(58) Field of Classification Search
CPC .......... B64D 43/02; G07C 5/085; G08G 5/003
See application file for complete search history.

(56) References Cited

U.S. PATENT DOCUMENTS

| 7,739,004 B2 | 6/2010 | Johnson | |
|---|---|---|---|
| 2013/0085669 A1* | 4/2013 | Bailey | G08G 5/0039 701/467 |

\* cited by examiner

*Primary Examiner* — Rodney A Butler
(74) *Attorney, Agent, or Firm* — Ostrager Chong Flaherty & Broitman P.C.

(57) ABSTRACT

A flight management system which has access to customized information concerning the actual characteristics of a specific airplane or a specific fleet of airplanes of the same model when computing a predicted flight profile and associated trip prediction parameters. This up-to-date airplane-specific or fleet-specific information is digital data configured as a separately loadable database called a "customized performance database". This customized performance database contains a smaller set of performance data—such as fuel flow correction, drag coefficient correction, and re-optimized speed/altitude tables—than is contained in the baseline performance database. The flight management system will continue to use a baseline performance database as a "limit" on the numbers computed using the customized performance database. The customized performance database can include tables or curves that are customizable by airlines.

20 Claims, 10 Drawing Sheets

```
         1     5       10      15      20   24
    1            PERF  PROGRESS        1/4
         START  WPT              END  WPT
    3 KBFI                            KMIA
         FUEL  SAVINGS
    5 0.8%
         AVG  SPD  DIFF
    7 .012
         AVG  ALT  DIFF
    9 300FT

11
      - - - - - - - - - - - - - - - - - - - -
   13 <INDEX
```

FIG. 12

FLIGHT MANAGEMENT SYSTEM HAVING CUSTOMIZED PERFORMANCE DATABASE

BACKGROUND

The technology disclosed herein generally relates to flight management systems for airplanes and, more particularly, relates to techniques for computing predicted flight profile and associated trip prediction parameters in a flight management system.

A flight management system (hereinafter "FMS" when used as an adjective) installed in the flight deck of a modern airplane performs various flight critical functions such as navigation, guidance, flight planning, datalink and performance. For the performance function, the flight management system has various internal algorithms (hereinafter "performance algorithms") that utilize aerodynamic and propulsion performance data (hereinafter "performance data") stored in a performance database to compute the predicted flight profile and the associated trip prediction parameters such as speed, altitude, estimated time of arrival (ETA) and predicted fuel consumption.

Many airlines are looking to enhance fuel performance through extensive on-ground flight/fuel planning to reflect the true fuel flow and drag characteristics of individual airplanes. It is known for a manufacturer of a particular model of an airplane to install or provide a baseline performance database onboard each airplane. As used herein, the term "baseline performance database" refers to an original performance database, generated by an airplane manufacturer, that is common to a multiplicity of airplanes of a particular model. Typically airplanes of a particular model have the same baseline performance database stored in memory disposed in or associated with the flight management system. Therefore, if two airlines have airplanes of the same model in their respective fleets, the baseline performance database used by one airline will be the same as that used by the other airline.

Currently, a flight management system has predefined baseline performance data that is used for various computations such as lateral and vertical trajectories, estimated fuel burn at various waypoints, estimated weights at various waypoints, etc. This predefined baseline performance data is consistent across an entire type of aircraft. For instance, all 737-800 airframes with winglets and 28K engines and of similar age are assumed to have the exact same performance characteristics. Currently, things like manufacturing tolerances are not accounted for in the predefined baseline performance data but have a real, and unique, impact to each specific airframe.

The typical baseline performance database in a flight management system contains aerodynamics and propulsion data that is representative of airplane characteristics determined during a series of flight tests that usually occur in a controlled environment with precise onboard measurement equipment before the airplane is delivered to a customer airline. It is assumed herein that a baseline performance database generated by testing an individual airplane of a particular model is equally applicable to all airplanes of the same model, in which case that same baseline performance database can be loaded into the flight management systems of all airplanes of that model. Such a widely employed baseline performance database is rarely updated once delivered to the airline due to large costs associated with build, test, and certification.

However, over the course of time the characteristics of individual airplanes of the same model may vary due to changes to the airplane's aerodynamic and propulsion characteristics. For example, due to changes to an airframe, such as repairs, addition or removal of antennas, configuration changes, etc., and engine deterioration, the airplane fuel flow and drag characteristics (e.g., a fuel factor and a drag coefficient respectively) may change over time. As a result, the performance algorithms and the baseline performance data may deviate from the actual airplane performance over time as an individual airplane continues to operate in service.

One solution in use today is that some flight management systems have a global, manual adjustment to the overall drag and overall fuel flow of the predefined baseline performance data. This solution allows the user to globally add a percent error to the flight management system's predefined drag data and fuel flow data. For instance, if the user enters a drag error of 4.2, the flight management system will now calculate all drag values as predefined_drag*1.042 (the asterisk indicates multiplication). This 4.2% additional drag component is added to all drag computations, regardless of where in the flight envelope the drag calculation takes place. This same issue exists with the global fuel flow adjustment. Additionally, users of the flight management system must develop their own methods for measuring the differences between the predefined baseline performance data and the actual performance and develop methods to extrapolate these differences into respective single drag and fuel flow error percentages. The largest drawback to the existing solution is that this is a global adjustment to all calculations and users must develop their own methods and schedules for updating the adjustments in the flight management system to maintain accurate airplane performance data.

The fleet of an airline may comprise a multiplicity of airplanes of the same model wherein each individual airline of that model in the fleet may have unique airplane characteristics. In this situation, an airline may want to update the performance database onboard each airplane in a timely and efficient manner to more accurately reflect the true characteristics of each airplane in its fleet. For example, individual airplanes may have fuel efficiency and drag characteristics which change differently over time.

In an alternative example, two airlines may have the same basic model of airplane in their respective fleets except that one airline has made modifications to the airplanes of that model which are absent from the airplanes of that model operated by the other airline. In this situation, the airline operating the modified airplanes may want to provide the same updated performance data for use by the flight management systems onboard all of the modified airplanes of the same model.

Thus it would be advantageous to provide an improved flight management system that uses up-to-date (i.e., most accurate) information that takes into account the variable actual characteristics of individual airplanes when computing a predicted flight profile and associated trip prediction parameters for that airplane.

SUMMARY

The subject matter disclosed in detail below is directed to a flight management system which has access to customized information concerning the actual characteristics of a specific airplane or a specific fleet of airplanes of the same model when computing a predicted flight profile and associated trip prediction parameters. This up-to-date airplane-specific or fleet-specific information is digital data configured as a separately loadable database called a "customized performance database". As used herein, the term "customized performance database" means a database containing performance information that is either airplane-specific (meaning that different airplanes of the same model have performance data representing different aerodynamic and propulsion characteristics of the individual airplanes) or fleet-specific (meaning that airplanes of the same model in the fleet of one airline have performance data representing a set of aerodynamic and propulsion characteristics that differ from the corresponding performance data of airplanes of the same model in the fleet of another airline). This customized performance database contains a smaller set of performance data—such as fuel flow correction, drag coefficient correction, and re-optimized speed/altitude tables—than is contained in the baseline performance database. The flight management system proposed herein will continue to use the baseline performance database as a baseline and use it as a "limit" on the numbers computed using the customized performance database. The customized performance database can include tables or curves that are customizable by airlines.

In accordance with the Convention on International Civil Aviation, all civil aircraft must be registered with a national aviation authority (NAA) using procedures set by each country. The NAA allocates a unique alphanumeric string to identify the aircraft, which also indicates the nationality (i.e., country of registration) of the aircraft. The registration identifier must be displayed prominently on the aircraft. The airplane-specific customized performance databases referred to herein include data representing the unique alphanumeric string identifying the specific aircraft.

Each set of updated aerodynamic and propulsion performance data may take the form of table or curve data. (As used herein, the term "table/curve data" means data in either tabular or curve format.) Upon receipt of updated aerodynamic and propulsion performance data, the flight management system uses that data to compute more accurate flight profile and trip prediction parameters, such as estimated time of arrival and predicted fuel consumption quantity. After the updated performance data has been retrieved from a non-transitory tangible computer-readable storage medium by the flight management system, the pilot is able to review basic information about the new performance data tables or curves and accept or reject them on appropriate pages on a flight deck control display unit (hereinafter "CDU" when used as an adjective). The control display unit is an interface system that allows a pilot to monitor and control various other airplane systems. The control display unit is the primary interface for the airplane's flight management system.

Although various embodiments of systems and methods for computing a predicted flight profile and associated trip prediction parameters are disclosed in some detail below, one or more of those embodiments may be characterized by one or more of the following aspects.

One aspect of the subject matter disclosed in detail below is a method for displaying a predicted value of a trip parameter onboard an airplane, comprising: (a) storing a baseline performance database in a non-transitory tangible computer-readable storage medium onboard the airplane, the baseline performance database comprising a first lookup table configured to output baseline performance data in response to input of at least one flight parameter value, which baseline performance data is a function of at least a baseline value of an airplane characteristic and the at least one flight parameter value; (b) storing a customized performance database in the same or a different non-transitory tangible computer-readable storage medium onboard the airplane, the customized performance database comprising a second lookup table configured to output customized performance data in response to input of the at least one flight parameter value, which customized performance data is a function of at least an airplane-specific or fleet-specific value of the airplane characteristic and the at least one flight parameter value; (c) calculating a first predicted value of the trip parameter using the baseline performance data output from the first lookup table; (d) calculating a second predicted value of the trip parameter using the customized performance data output from the second lookup table; (e) calculating a difference of the first and second predicted values of the trip parameter; (f) comparing the difference to a specified threshold; and (g) displaying alphanumeric symbology on a display unit in the flight deck during the current flight of the airplane, wherein the alphanumeric symbology represents the first predicted value of the trip parameter if the difference is greater than the specified threshold or the second predicted value of the trip parameter if the difference is less than the specified threshold. At least steps (c) through (f) are performed by a flight management computer onboard the airplane. The method further comprises disabling the customized performance database for use if the difference is greater than the specified threshold.

In accordance with some embodiments of the method described in the preceding paragraph, the method further comprises: (h) determining whether the customized performance database contains data associated with flight conditions applicable to the airplane or not; and (i) accepting the customized performance database for use if a determination is made that the customized performance database contains data associated with the flight conditions applicable to the airplane.

Another aspect of the subject matter disclosed in detail below is a method for displaying a predicted value of a trip parameter onboard an airplane, comprising: (a) storing a baseline performance database in a non-transitory tangible computer-readable storage medium onboard the airplane, the baseline performance database comprising a first lookup table configured to output baseline performance data in response to input of at least one flight parameter value, which baseline performance data is a function of at least a baseline value of an airplane characteristic and the at least one flight parameter value; (b) storing a customized performance database in the same or a different non-transitory tangible computer-readable storage medium onboard the airplane, the customized performance database comprising a second lookup table configured to output customized performance data in response to input of the at least one flight parameter value, which customized performance data is a function of at least an airplane-specific or fleet-specific value of the airplane characteristic and the at least one flight parameter value; (c) determining whether the airplane is flying within ranges of speed and altitude having associated updated data in the customized performance database or not; (d) enabling the customized performance database for use if a determination is made in step (c) that the airplane is flying within ranges of speed and altitude having associated updated data in the customized performance database; (e) retrieving the customized performance data while the customized performance database is enabled; (f) calculating a predicted value of the trip parameter using the customized performance data retrieved from the customized performance database; and (g) displaying first alphanumeric symbology on a display unit in the flight deck during the current flight of the airplane, wherein the first alphanumeric symbology represents the predicted value of the trip parameter. This method may further comprise disabling the customized performance database for use if a determination is made in step (c) that the airplane is not flying within ranges of speed and altitude having associated updated data in the customized performance database.

In accordance with some embodiments of the method described in the preceding paragraph, the method further comprises: (h) measuring a value of the trip parameter to produce a measured value of the trip parameter; (i) calculating a magnitude of a deviation of the measured value of the trip parameter from the predicted value of the trip parameter; (j) determining whether the magnitude of the deviation exceeds a first specified threshold or not; (k) repeating steps (h) through (j) during multiple flights; (l) determining whether the number of determinations that the magnitude of the deviation exceeded the first specified threshold exceeds a second specified threshold or not; and (m) displaying second alphanumeric symbology on the display unit in response to a determination in step (l) that the number of determinations that the magnitude of the deviation exceeded the first specified threshold exceeds the second specified threshold. The second alphanumeric symbology indicates that replacement of the customized performance database is warranted.

A further aspect of the subject matter disclosed in detail below is a method for displaying a predicted value of a trip parameter onboard an airplane, comprising: (a) storing a baseline performance database in a non-transitory tangible computer-readable storage medium onboard the airplane, the baseline performance database comprising a first lookup table configured to output baseline performance data in response to input of at least one flight parameter value, which baseline performance data is a function of at least a baseline value of an airplane characteristic and the at least one flight parameter value; (b) storing a customized performance database in the same or a different non-transitory tangible computer-readable storage medium onboard the airplane, the customized performance database comprising a second lookup table configured to output customized performance data in response to input of the at least one flight parameter value, which customized performance data is a function of at least an airplane-specific or fleet-specific value of the airplane characteristic and the at least one flight parameter value; (c) determining whether the customized performance database contains data associated with an obsolete configuration of the airplane or not; (d) enabling the customized performance database for use if a determination is made in step (c) that the customized performance database does not contain data associated with the obsolete configuration of the airplane; (e) retrieving the customized performance data while the customized performance database is enabled; (f) calculating a predicted value of the trip parameter using the customized performance data retrieved from the customized performance database; and (g) displaying alphanumeric symbology on a display unit in the flight deck during the current flight of the airplane, wherein the alphanumeric symbology represents the predicted value of the trip parameter calculated using information retrieved from the customized performance database. This method may further comprise disabling the customized performance database for use or triggering a pilot warning if a determination is made in step (c) that the customized performance database contains data associated with the obsolete configuration of the airplane.

Yet another aspect of the subject matter disclosed in detail below is a system for displaying a predicted value of a trip parameter onboard an airplane, comprising a display unit and a computer system configured to perform the following operations: (a) store a baseline performance database in a non-transitory tangible computer-readable storage medium onboard the airplane, the baseline performance database comprising a first lookup table configured to output baseline performance data in response to input of at least one flight parameter value, which baseline performance data is a function of at least a baseline value of an airplane characteristic and the at least one flight parameter value; (b) store a customized performance database in the same or a different non-transitory tangible computer-readable storage medium onboard the airplane, the customized performance database comprising a second lookup table configured to output customized performance data in response to input of the at least one flight parameter value, which customized performance data is a function of at least an airplane-specific or fleet-specific value of the airplane characteristic and the at least one flight parameter value; (c) determine whether the airplane is flying within ranges of speed and altitude having associated updated data in the customized performance database or not; (d) enable the customized performance database for use if a determination is made in step (c) that the airplane is flying within ranges of speed and altitude having associated updated data in the customized performance database; (e) retrieve the customized performance data while the customized performance database is enabled; (f) calculate a predicted value of the trip parameter using the customized performance data retrieved from the customized performance database; and (g) control the display unit to display first alphanumeric symbology during the current flight of the airplane, wherein the first alphanumeric symbology represents the predicted value of the trip parameter calculated using the information retrieved from the customized performance database. The computer system may be further configured to disable the customized performance database for use if a determination was made in operation (c) that the airplane is not flying within ranges of speed and altitude having associated updated data in the customized performance database.

In accordance with some embodiments of the system described in the preceding paragraph, the system further comprises a measurement system configured to measure the trip parameter during flight of the airplane to produce a measured value of the trip parameter, in which case the computer system is further configured to perform the following operations: (h) receiving the measured value of the trip parameter from the measurement subsystem; (i) calculating a magnitude of a deviation of the measured value of the trip parameter from the second predicted value of the trip parameter; (j) determining whether the magnitude of the deviation exceeds a first specified threshold or not; (k) repeating steps (h) through (k) during multiple flights; (l) determining whether the number of determinations that the magnitude of the deviation exceeded the first specified threshold exceeds a second specified threshold or not; and (m) controlling the display unit to display second alphanumeric symbology in response to a determination in operation (k) that the number of determinations that the magnitude of the deviation exceeded the first specified threshold exceeds the second specified threshold, wherein the second alphanumeric symbology indicates that replacement of the customized performance database is warranted.

Other aspects of systems and methods for displaying symbology representing a predicted value of a trip parameter onboard an airplane are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

FIG. 7 is a diagram representing a CDU page showing the name of a customized performance database that can be selected for enablement automatically or manually.

FIG. 8 is a diagram representing a CDU page listing the names of various FMS functions which can be automatically or manually selected to use either the customized performance database or the baseline performance database.

FIG. 12 is a diagram representing a CDU page that allows the flight crew to specify the start and end waypoints for using the airplane performance tables or curves selected using the CDU page depicted in FIG. 8.

Reference will hereinafter be made to the drawings in which similar elements in different drawings bear the same reference numerals.

DETAILED DESCRIPTION

Illustrative embodiments of an improved avionics flight management system are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

It is likely that an airplane's performance will not change overnight or even during several flights unless there has been some repair work or configuration changes to the airplane to change the performance characteristics. Rather, it is expected that the change will be gradual so that a ground-based system can collect the airplane performance data over time (for example, over the course of one month). Data collection can be done in multiple ways. For example, a maintenance crew can go to the airplane while on the ground and download the data. Or there can be a system that automatically sends out the data when the airplane pulls into the airport gate. Or the airplane can send out the data in real time. Then, using the data collected during this period, the ground-based system will analyze the performance data and generate updated tables or curves, which are stored in computer memory and ready for uploading. The new tables/curves may not reflect the current flight or even several previous flights, but still the new tables/curves should be very accurate since they reflect the data over a period of a month. Then, during one of the flights, when the flight management system detects that the real-time airplane performance consistently deviates too much from the expected airplane performance represented by the baseline performance database (already in the flight management system) or maybe simply it has been a month since the last update, a customized performance database containing the updated tables/curves can be loaded into a memory disposed in or associated with the flight management system.

Figure 1:
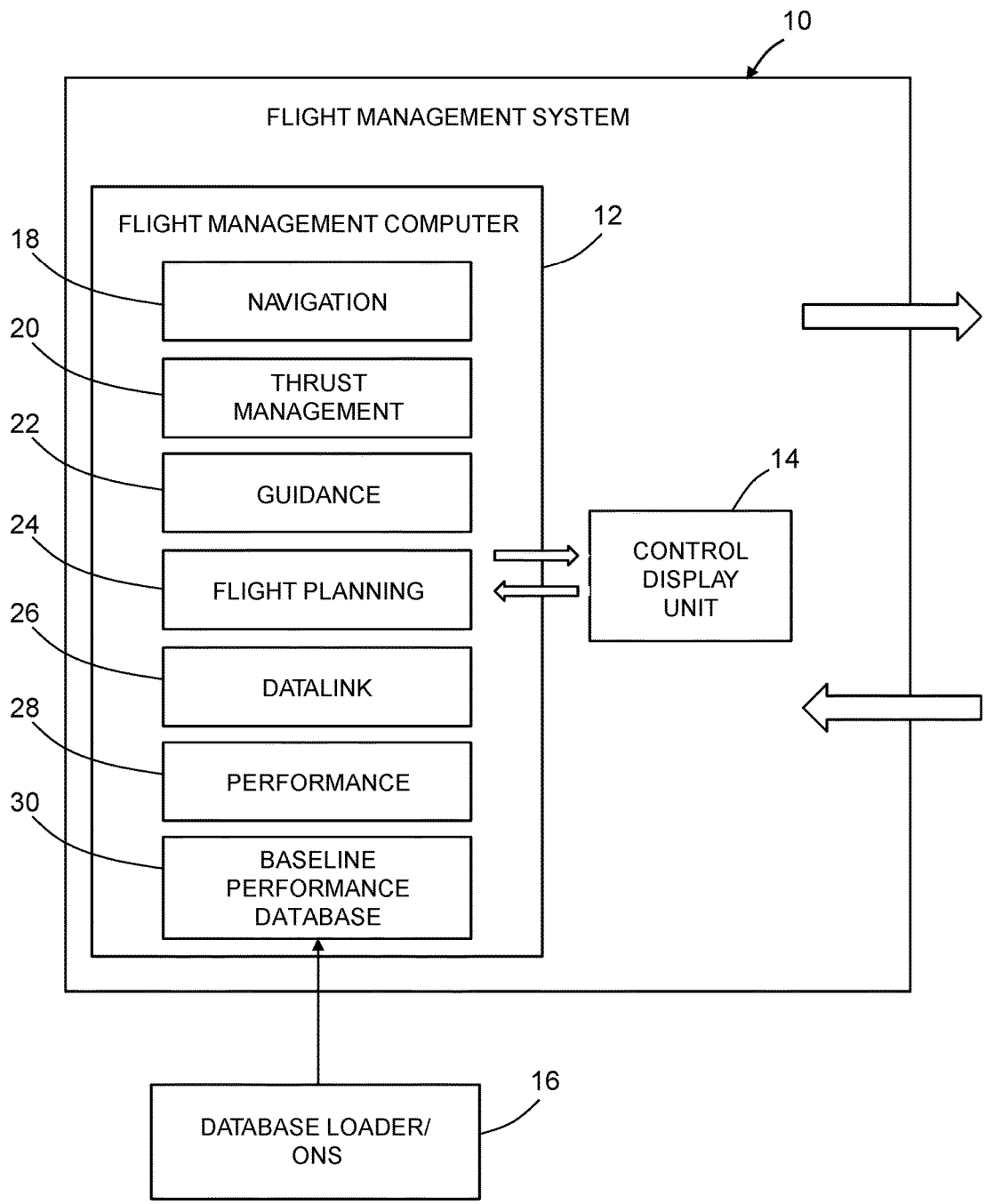
FIG. 1 is a block diagram showing an overall architecture of a typical flight management system.

FIG. 1 is a block diagram showing an overall architecture of a typical flight management system 10 of a type comprising one or more flight management computers and one or more control display units. Only one flight management computer 12 and one control display unit 14 are depicted in FIG. 1. The control display units are the primary interface between the flight management computer 12 and the pilots.

The computer code executed by the flight management computer (hereinafter "FMC software") may reside on respective core processors in respective airplane information management system (AIMS) cabinets. The FMC software may comprise the following: flight management functionality, a navigation function 18, a thrust management function 20, and a baseline performance database 30 (for example, an aero/engine database containing aerodynamic and propulsion data). The flight management functionality comprises guidance 22, flight planning 24, a datalink management function 26, a performance management function 28, CDU interfaces, an interface to the baseline performance database 30, and other functionalities. The navigation function 18 provides sensor selection (inertial, radio, satellite), position solution determination and other functionalities. The navigation function 18 computes airplane position, velocity, track angle and other airplane parameters, collectively termed airplane states, to support functions such as flight planning, guidance, and display as well as AIMS—external functions.

The flight management system 10 integrates information from an air data and inertial reference system, navigation sensors, engine and fuel sensors, and other airplane systems (not shown in FIG. 1), along with internal databases and crew-entered data to perform the multiple functions. The flight management computer may contain a navigation database (not shown in FIG. 1) and the baseline performance database 30.

For the performance management function 28, the flight management system 10 has various internal algorithms that utilize aerodynamic and propulsion performance data stored in the baseline performance database 30 to compute predicted flight profile and the associated trip prediction parameters such as ETA and predicted fuel consumption quantity. The performance management function 28 uses aerodynamic and propulsion models and optimization algorithms to generate a full flight regime vertical profile consistent with the performance mode selected and within flight plan constraints imposed by air traffic control. Inputs to the performance management function 28 include fuel flow, total fuel, flap position, engine data and limits, altitude, airspeed, Mach number, air temperature, vertical speed, progress along the flight plan and pilot inputs from the control display unit 14. The outputs are target values of Mach number, calibrated airspeed and thrust for optimum control of the airplane, and advisory data to the crew.

Various performance modes for each flight phase, such as economy climb, economy cruise and long-range cruise, may be selected by the pilot through the control display unit 14. Multiple performance modes may be specified for the cruise flight phase. The default mode is an economy profile with speed limited. Economy profiles are computed to optimize fuel or time costs as governed by a cost index factor.

The aerodynamic and propulsion models are used to generate an optimum vertical profile for the selected performance modes. If the autothrottle or autopilot is not engaged for automatic control of the performance management function 28, the pilot can manually fly the optimum speed schedule by referring to the control display unit 14 and to the airspeed bug on the speed tape.

In accordance with the embodiment depicted in FIG. 1, the baseline performance database 30 is loaded by a database loader 16 using an onboard network system (ONS in FIG. 1). The baseline performance database 30 contains pre-defined data (referred to herein as "airplane characteristics") for the aerodynamic model of the airplane as well as for the engine performance model and thrust rating model of the engines. The performance management function 28 depicted in FIG. 1 can be configured to execute a performance algorithm that retrieves the pre-defined data representing airplane characteristics from the baseline performance database 30. The retrieved pre-defined data, in combination with current flight parameter data representing measured flight parameters, is used by the performance management function 28 to compute real-time parameters such as speed limits and speed targets, and to perform predictive computations such as flight plan predictions. The baseline performance database 30 is also used by the thrust management function 20 to compute thrust limits.

Figure 2:
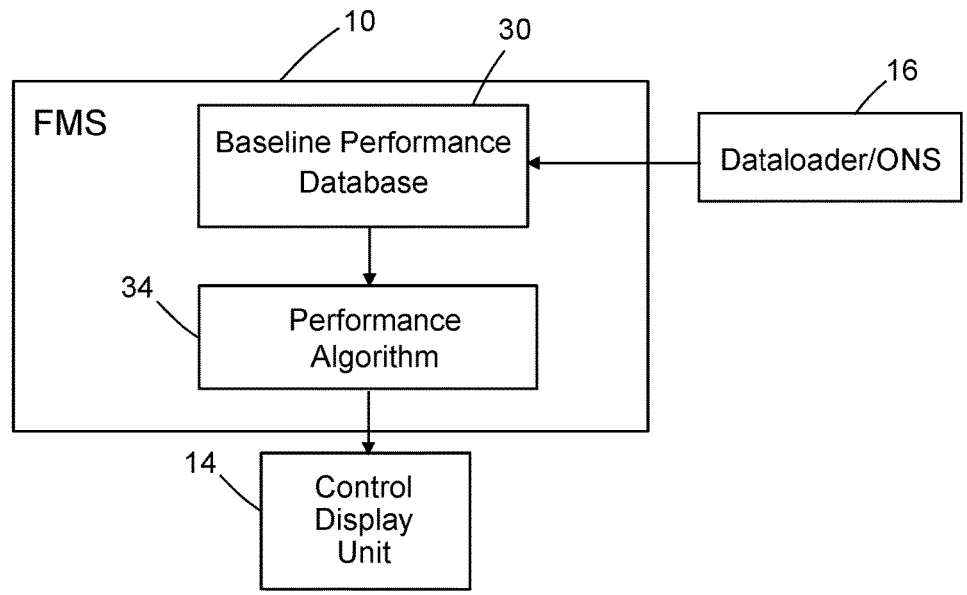
FIG. 2 is a block diagram identifying some components of the flight management system depicted in FIG. 1.

As shown in FIG. 2, baseline performance data can be loaded into a baseline performance database 38 by means of the database loader 16. The performance algorithms 28 then retrieve pertinent baseline performance data from the baseline performance database 30 and use it to compute a predicted value of a trip parameter. The result of that computation is displayed on the control display unit 14 for viewing by the flight crew.

Figure 3:
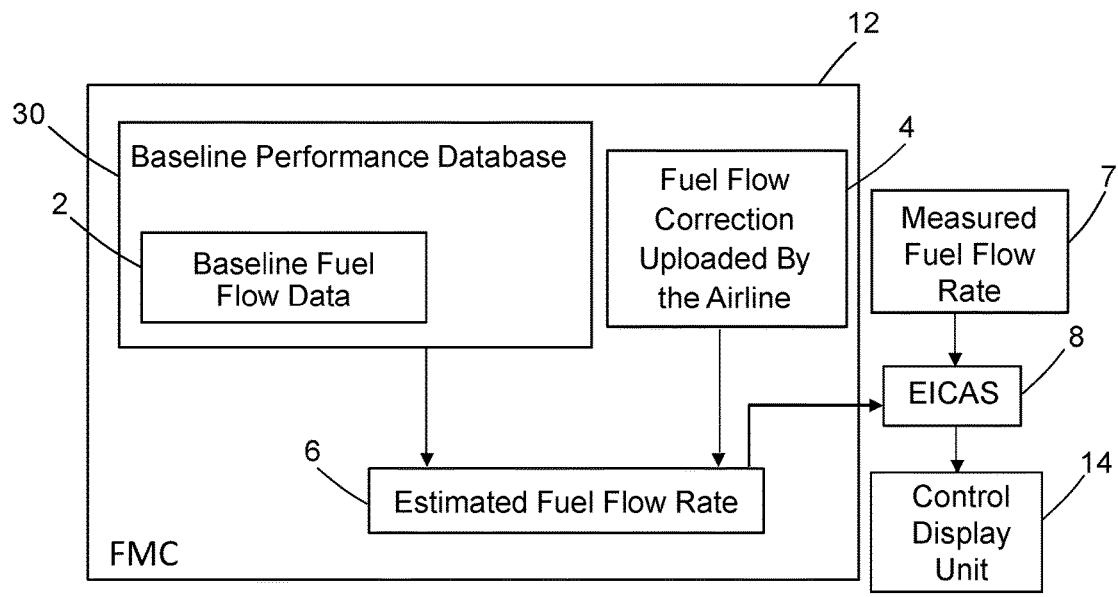
FIG. 3 is a block diagram identifying components of a subsystem for calculating fuel flow, which process is part of the performance management function depicted in FIG. 1.

For example, FIG. 3 is a block diagram identifying components of a subsystem for estimated the current fuel flow rate, which process is part of the performance management function 28 depicted in FIG. 1. In accordance with one flight management computer configuration, the estimated fuel flow rate 6 is computed using both baseline fuel flow data 2 stored in the baseline performance database 30 and a fuel flow correction 4 updated/entered by the airline. The fuel flow correction 4 can simply be a percentage number. For example, if it is 1%, then the baseline fuel flow data 2 is changed by 1%.

Typically an airplane is also equipped with means for measuring the actual fuel flow in real time. The method comprises the step of obtaining an estimated current fuel flow rate for each engine of the airplane based on a set of predetermined reference operating parameters for each engine. Preferably, the predetermined reference operating parameters of the engine include engine thrust, airspeed, altitude, outside air temperature, engine accessory loads (such as electric generators, bleed air loads, hydraulic pump loads, and other loads), and engine age (number of cycles). The predetermined reference operating parameters for each engine may be obtained from a look-up table in the baseline performance database 30. The method further comprises the step of obtaining a measured fuel flow rate 7 for each engine of the airplane based on actual operating parameters for each engine. The measured fuel flow rate 7 for each engine is obtained in several steps. A flow meter installed in the fuel line physically measures the volume of fuel traveling through the line. A fuel densitometer installed in the fuel tank computes the fuel density. Software multiplies the volumetric fuel flow rate by the fuel density to obtain a fuel mass flow rate (i.e., measured fuel flow rate 7) which is displayed to the pilot. The method further comprises using an engine monitoring system software, such as the software used by the engine indication and crew alerting system (EICAS) 8 depicted in FIG. 3, to compare the estimated fuel flow rate 6 to the measured fuel flow rate 7. The method further comprises the step of automatically providing an alert on control display unit 14 if there is a difference above a specified threshold between the measured fuel flow rate 7 and the estimated fuel flow rate 6. The estimated fuel flow rate 6 is compared to the measured fuel flow rate 7 at a certain engine thrust, altitude, and speed, and if the actual fuel flow rate is much higher than what is predicted, the message is flagged for that engine, and an alert is automatically displayed on the control display unit 14.

Figure 4:
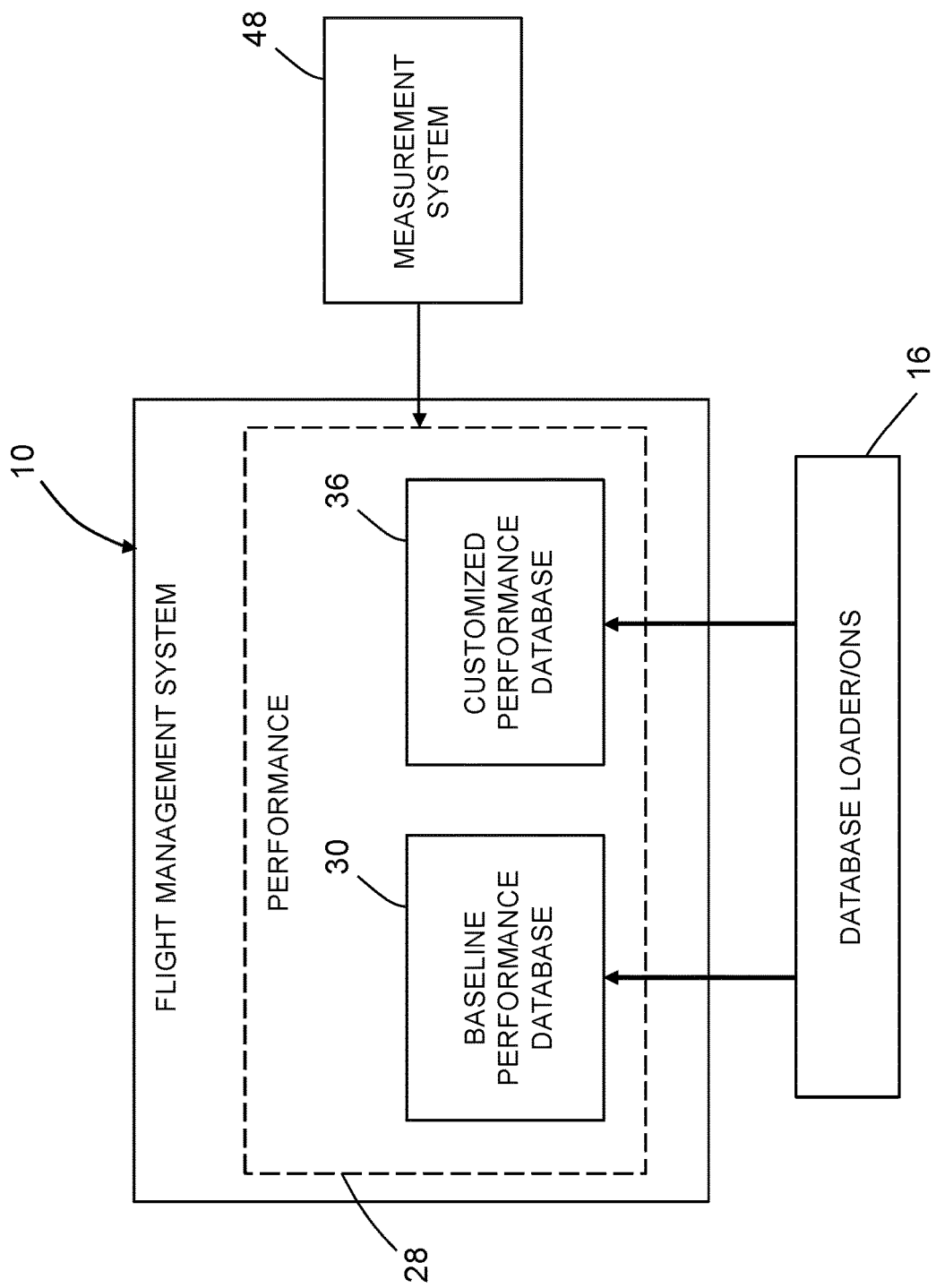
FIG. 4 is a block diagram identifying some components of a flight management system that utilizes a customized performance database in accordance with one embodiment.

In accordance with the embodiments disclosed in detail below, an improved flight management system is provided with access to a set of airplane-specific or fleet-specific customized performance data tables or curves which enable FMS performance algorithms to utilize the up-to-date (i.e., most accurate) fuel flow and drag data. FIG. 4 is a block diagram identifying some components of a flight management system 10 that utilizes a separately loadable customized performance database 36 containing a smaller set of performance data (such as fuel flow correction, drag correction, and re-optimized speed/altitude tables) than is contained in the baseline performance database 30. Using the updated aerodynamic and propulsion performance data in the customized performance database 36, the flight management system 10 is able to compute a more accurate flight profile and more accurate trip prediction parameters such as estimated time of arrival and predicted fuel consumption quantity. In accordance with one embodiment, the flight management system 10 is further configured to receive a measured value of a trip parameter from a measurement system 48 and compare that measured value to the predicted value retrieved from or computed using data retrieved from the customized performance database 36. The flight management system 10 will continue to use the baseline performance database 30 as a "limit" on the numbers computed using the customized performance database 36.

The customized performance database 36 can include tables or curves that are customizable by airlines. One example of a type of performance data table that may be included in a customized performance database is a drag coefficient data table, which can be loaded as digital data into a non-transitory tangible computer-readable storage medium via a datalink or using an onboard network system. In the drag coefficient data table, a first input variable X is Mach number, a second input variable Y is altitude (in feet) and the output variable Z is drag coefficient. In this case, the drag coefficients are airplane-specific, meaning that each airplane of a particular model in a fleet will have its own set of unique updated drag coefficients. When such a customized performance data table is created or updated, the values are stored in a table format (having two or more dimensions) so that the values can be looked up and used in an efficient manner by the flight management system for performance computations such as trip prediction.

One example of a type of performance data curve that may be included in an airplane-specific or fleet-specific customized performance database is a fuel mileage versus Mach number curve. A set of fuel mileage versus Mach number curves can be loaded as digital data into a non-transitory tangible computer-readable storage medium via a datalink or using an onboard network system. Different airplanes of the same model may be characterized by different sets of fuel mileage versus Mach number curves. These curves, which are respectively associated with various speed/altitude ranges, can be used by an FMS performance algorithm (e.g., Long Range Cruise) in a typical flight management system. The Long Range Cruise performance algorithm can use the fuel flow values to compute long-range cruise Mach numbers for weights and altitudes of interest using known equations, for example: by computing fuel mileage using the ratio of true airspeed to fuel flow; determining the Mach number and associated fuel mileage where the fuel mileage is at a maximum, and then calculating the long-range cruise Mach number by multiplying the Mach number corresponding to maximum fuel mileage times a specified percentage (e.g., 99%). The computed long-range cruise Mach numbers can also be stored in the customized airplane performance data table with weight and temperature as the input variables along with the fuel mileage versus Mach number curves. The long-range cruise Mach numbers can simply be looked up in the customized performance database. In addition, if both the Long Range Cruise table and the fuel mileage versus Mach number curves are stored in the customized performance database, then the fuel mileage versus Mach number curve can also be used for other purposes, e.g., other speed schedules such as Maximum Range Speed.

In accordance with one embodiment, an airplane-specific or fleet-specific customized performance database 36 can be separately and temporarily loaded into a memory disposed in or associated with the flight management system 10. Then the flight management system 10 detects whether that customized performance database 36 is applicable for the specific airplane or fleet of airplanes or not. If the flight management computer 12 detects that a table or curve in the customized performance database 36 contains updated data for a range of flight parameters at which this specific airplane or this specific fleet of airplanes usually flies, then the flight management computer 12 would automatically accept the customized performance database 36 and store it in its memory for future use. For example, the flight management computer 12 detects that a range of gross weight, speed, or altitude data in the customized performance database 36 has been updated (i.e., is different from corresponding data in the baseline performance database), and this range is applicable to this specific airplane or this specific fleet of airplanes, then the flight management computer 12 automatically accepts the customized performance database 36. Also during a flight, if the flight management computer 12 detects that the airplane is flying a range of speed/altitude whose data have been updated in the customized performance database 36, then the flight management computer 12 would enable the customized performance database 36 for use. On the other hand, if the flight management computer detects that the airplane starts to operate under different flight conditions such as different gross weight, cruise altitude, cost Index, environmental parameters (wind, temperature, air pressure), date, or time, or starts to fly a different route than before, or goes through configuration changes (such as engine updates, maintenance activities, airframe changes), then the flight management computer 12 automatically disables the customized performance database 36 or triggers a warning that the customized performance database 36 may no longer be applicable to this specific airplane or to this specific fleet of airplanes.

In accordance with one embodiment of the flight management system 10, there are two ways to load the customized performance data. In accordance with a first protocol, a customized performance data table is stored in a non-transitory tangible computer-readable storage medium in a performance table format (having two or more dimensions) so that the values can be looked up and used in an efficient manner by the flight management system 10 for performance computations such as trip prediction. In accordance with a second protocol, a customized performance data curve is stored in a non-transitory tangible computer-readable storage medium in a performance curve format.

The curves may be constructed at a ground station based on empirical or simulated data in a table. For each curve, a polynomial that best fits the curve is calculated. As used herein, the term "polynomial" means a mathematical expression consisting of variables and coefficients and involving only the operations of addition, subtraction, multiplication, and non-negative integer exponents of variables. For example, the polynomial may take the following form: $f(x)=a_0x^0+a_1x^1+a_2x^2+a_3x^3+\ldots$ .

In accordance with some embodiments, a method is provided for automatically enabling or disabling the use of the customized performance database 36 by different FMS performance functions at different phases of flight on a specific airplane. There are several FMS performance functions that may utilize the customized performance database 36. When one of these FMS performance functions uses a table or curve from the customized performance database 36 and detects that its computed value exceeds a certain threshold relative to a value computed using the baseline performance database 30, then the flight management computer 12 automatically disables use of the customized performance database 36 by that FMS performance function. For example, in accordance with one embodiment, if when the flight management computer 12 computes a first value of the Economy Cruise Speed using the customized performance database 36 and a second value of the Economy Cruise Speed using the baseline performance database 30, the difference between the first and second values exceeds 10%, then the flight management computer 12 will disable the Economy Cruise Speed computation using the customized performance database 36 and revert to the baseline performance database 30.

Figure 5:
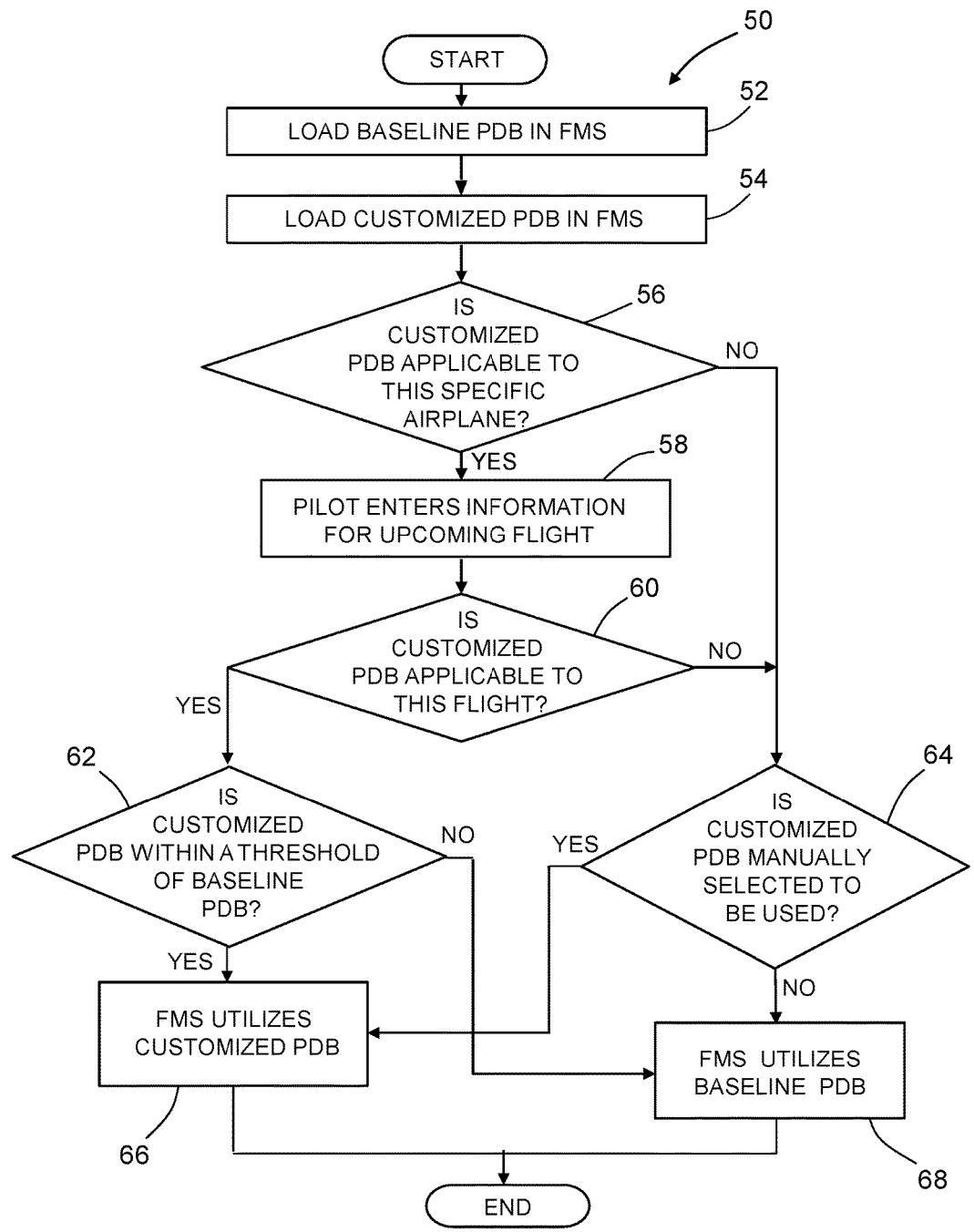
FIG. 5 is a flowchart listing steps of an automated method in accordance with one embodiment wherein the flight management system uses decision logic to determine whether to utilize (i.e., retrieve a predicted value of a trip parameter from) the baseline performance database or the customized performance database.

FIG. 5 is a flowchart listing steps of an automated method 50 in accordance with one embodiment wherein the flight management system 10 uses decision logic to determine whether to utilize information from the baseline performance database 30 or from the customized performance database 36 when it calculates a flight profile or predicted values of associated trip parameters. Prior to utilization, the baseline performance database 30 is loaded into the flight management system 10 (step 52). The customized performance database 36 is also loaded into the flight management system 10 (step 54). Later the flight management system 10 determines whether the customized performance database 36 is applicable to this specific airplane or to the specific fleet that this specific airplane belongs to (step 56).

If a determination is made in step 56 that the customized performance database 36 is not applicable to this specific airplane or to the specific fleet that it belongs to, then the flight management system 10 determines whether the customized performance database 36 has been manually selected for use by the pilot (step 64). On the one hand, if a determination is made in step 64 that the customized performance database 36 has not been manually selected for use by the pilot, the flight management system 10 configures itself so that it will utilize the baseline performance database 30 when it executes any portion of the performance function 28 (step 68). On the other hand, if a determination is made in step 64 that the customized performance database 36 has been manually selected for use by the pilot, the flight management system 10 configures itself so that it will utilize the customized performance database 36 when it executes any portion of the performance function 28 (step 66).

If a determination is made in step 56 that the customized performance database 36 is applicable to this specific airplane or to the specific fleet that it belongs to, then after the pilot has entered the flight plan for the upcoming flight (step 58), the flight management system 10 determines whether the customized performance database 36 is applicable to this specific flight (step 60). For example, the flight management system 10 may determine whether the customized performance database 36 contains updated information for any portion, phase or aspect of the planned flight.

If a determination is made in step 60 that the customized performance database 36 is not applicable to this specific flight, then the flight management system 10 determines whether the customized performance database 36 has been manually selected for use by the pilot (step 64). On the one hand, if a determination is made in step 64 that the customized performance database 36 has not been manually selected for use by the pilot, the flight management system 10 configures itself so that it will utilize the baseline performance database 30 when it executes any portion of the performance function 28 (step 68). On the other hand, if a determination is made in step 64 that the customized performance database 36 has been manually selected for use by the pilot, the flight management system 10 configures itself so that it will utilize the customized performance database 36 when it executes any portion of the performance function 28 (step 66).

If a determination is made in step 60 that the customized performance database 36 is applicable to the specific flight, then the flight management system 10 determines whether the predicted trip parameter value computed by a particular FMS performance function using the customized performance database 36 is within a specified threshold of the predicted trip parameter value computed by that same FMS performance function using the baseline performance database 30. On the one hand, if a determination is made in step 62 that the predicted trip parameter value computed using the customized performance database 36 is not within a specified threshold of the predicted trip parameter value computed using the baseline performance database 30, the flight management system 10 configures itself so that the particular FMS performance function will utilize the baseline performance database 30 (step 68) and not the customized performance database 36. On the other hand, if a determination is made in step 62 that the predicted trip parameter value computed using the customized performance database 36 is within the specified threshold of the predicted trip parameter value computed using the baseline performance database 30, the flight management system 10 configures itself so that the particular FMS performance function will utilize the customized performance database 36 (step 66) and not the baseline performance database 30.

When the FMS performance algorithms use the data tables or curves from the customized performance database 36, this state can be communicated to the pilot by various visual indications on the CDU pages or on the flight deck displays. For example, the CDU page can be changed to reflect that the FMS performance algorithm is using the customized performance database 36 instead of the baseline performance database 30.

Figure 6:
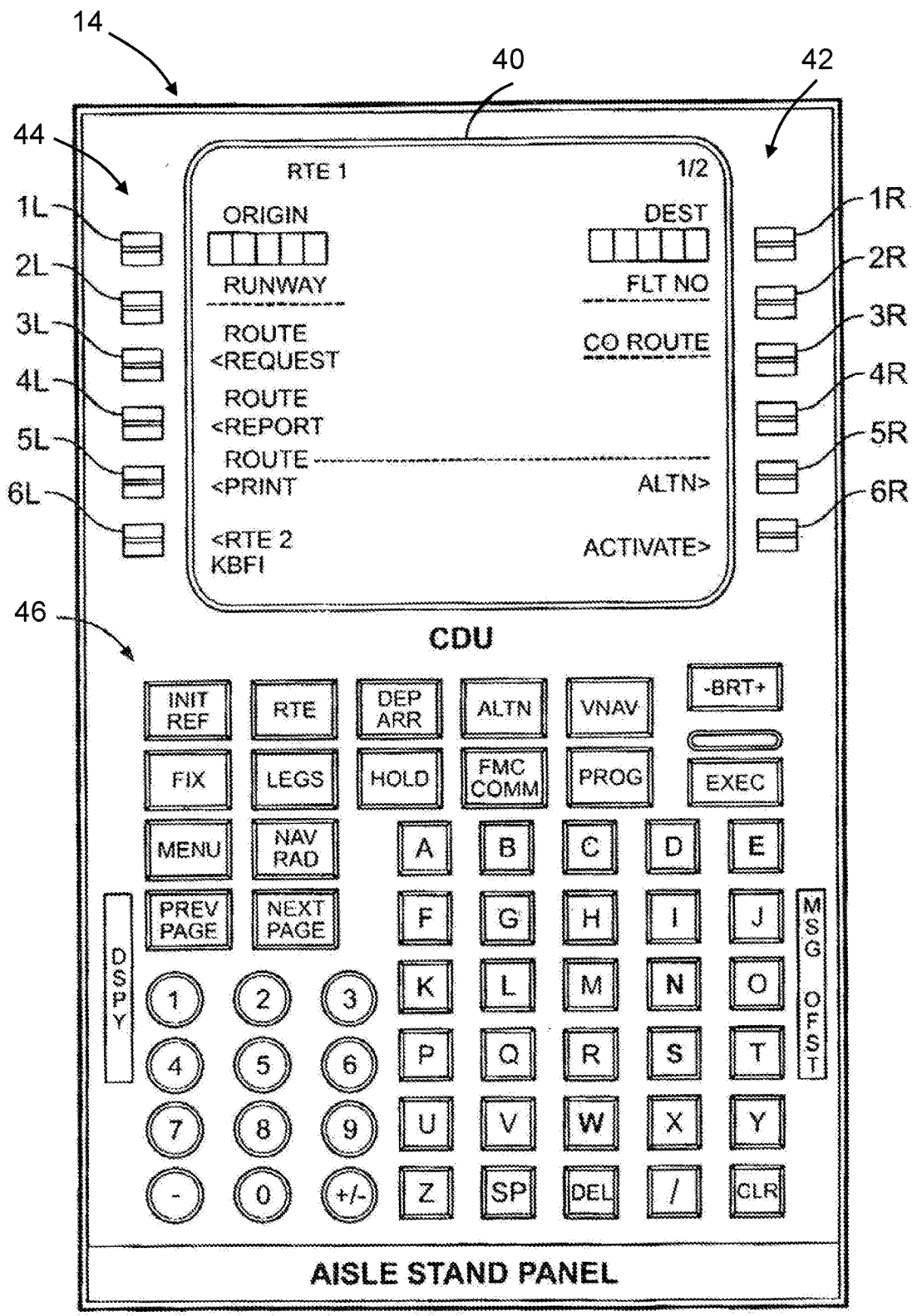
FIG. 6 is a diagram representing a front view of a control display unit for a commercial airplane.

FIG. 6 is a diagram representing a front view of a typical control display unit 14 for a commercial airplane. The control display unit 14 has a liquid crystal display (LCD) screen 40 and a keypad 46. Keypad 46 includes CDU page keys, alphanumeric entry keys, and various CDU display function keys. The LCD screen 40 can have at least one entry field, a plurality of display lines, and a plurality of line select keys corresponding to display lines. A typical control display unit 14 includes twelve display lines and twelve line select keys, a set 44 of six on the left and a set 42 of six on the right. The line select keys to the left of the LCD screen 40 are respectively identified by the designations 1L through 6L, while the line select keys to the right of the LCD screen 40 are respectively identified by the designations 1R through 6R. The entry field for the depicted control display unit 14 is below the twelfth display line and is commonly referred to as the "scratchpad". The scratchpad is a buffer to hold all data for review prior to executing the input. As data is keyed into the control display unit 14 with the keypad 46, the entered values are displayed within the scratchpad field at the bottom of the LCD screen 40. The conventional method of entering and displaying information on the control display unit 14 requires multiple inputs by the pilot. The pilot first enters the information into the scratchpad entry field using the keypad 46 and then presses one of the line select keys associated with the display line where the entered information is to be displayed.

The labeled function keys of keypad 46 are used to call up specific top-level pages of the control display unit 14 and to simultaneously dedicate the line select keys to the functions indicated on that page. Some functions, which are less frequently used in flight, are accessed through the index and flight plan edit function keys and then via line select keys 1L-6L and 1R-6R on the respective menu page. The line select keys 1L-6L and 1R-6R can be used to access lower level pages, toggle modes of the function, enter data in the associated field, or copy data in the scratchpad. When undefined line select keys are pressed, no operation is performed and no annunciation is displayed.

Figures 7, 8:
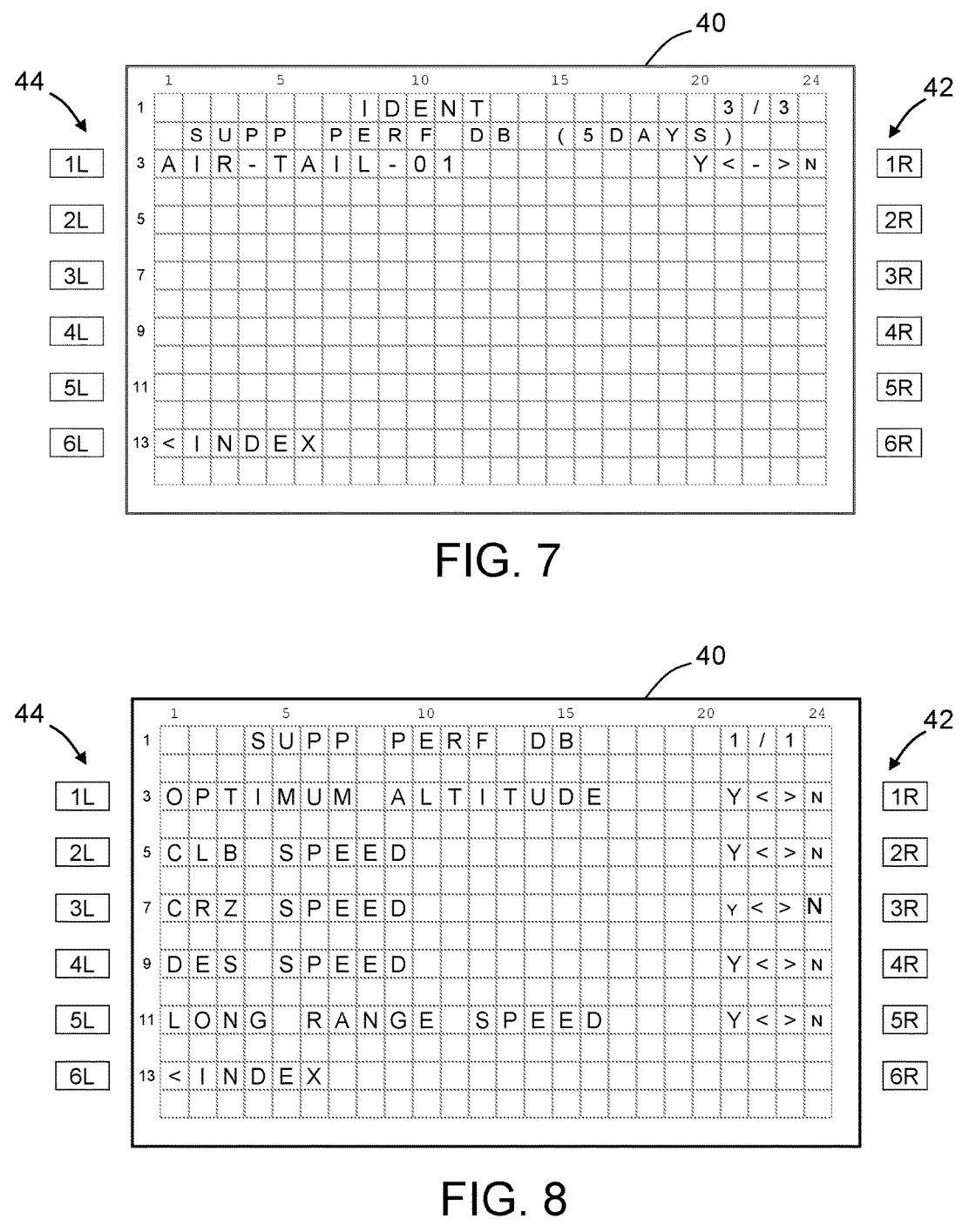

In accordance with some embodiments, the pilot may manually select which performance database should be utilized by which FMS performance function using the control display unit 14 or similar pilot interface device. FIG. 7 is a diagram representing a CDU page (named "IDENT") that identifies by name (i.e., "AIR-TAIL-01") a customized performance database for a specific airplane that can be selected for enablement automatically or manually. The state of enablement of the customized performance database can be toggled between Enable (Y) and Disable (N) automatically or manually. It also shows days remaining (i.e., "5 DAYS") before the customized performance database 36 is recommended to be replaced with a newer version.

Referring still to FIG. 7, the flight crew can interact with the control display unit 14 to individually accept or reject each customized performance database listed on the DENT page. For each individual customized performance database (only one such database is indicated in the example shown in FIG. 7), the flight crew can use the line select keys 1L-6L and 1R-6R to toggle between Yes (Y) and No (N) for each display line to select which of the listed customized performance databases the flight management system 10 should use or not use. The selection (Y or N) is indicated on the CDU page by using a relatively larger font size to display the letter representing the option selected and a relatively smaller font size to display the letter representing the option not selected.

FIG. 8 is a diagram representing a CDU page named "SUPP PERF DB" which lists the names of various FMS performance functions which can be automatically or manually selected to use either the customized performance database 36 or the baseline performance database 30. This CDU page is activated only when the customized performance database 36 listed on the CDU page depicted in FIG. 7 is selected for use. The CDU page depicted in FIG. 8 can be used by the flight crew to individually select which accepted customized performance tables or curves will be utilized by the flight management system 10. For the individual customized performance tables/curves, the flight crew can use the line select keys 1L-6L and 1R-6R to toggle between Yes (Y) and No (N) to select which of the accepted customized performance tables and curves the flight management system 10 should use or not use.

Based on the content (i.e., data tables and/or curves) of the customized performance database 36, corresponding FMS performance functions can be displayed on the CDU page as depicted in FIG. 8. For example, only when the customized performance database 36 has all tables required to compute Optimum Altitude, the enablement of Optimum Altitude should be indicated by the display of a letter "Y" with a relatively larger font size than the font size of letter "N". When the customized performance database 36 is disabled, then the CDU page seen in FIG. 8 cannot be accessed by the pilot. Also the selection of the functions on this CDU page can be made only on the ground to prevent any unintended selections during flight.

Figure 9:
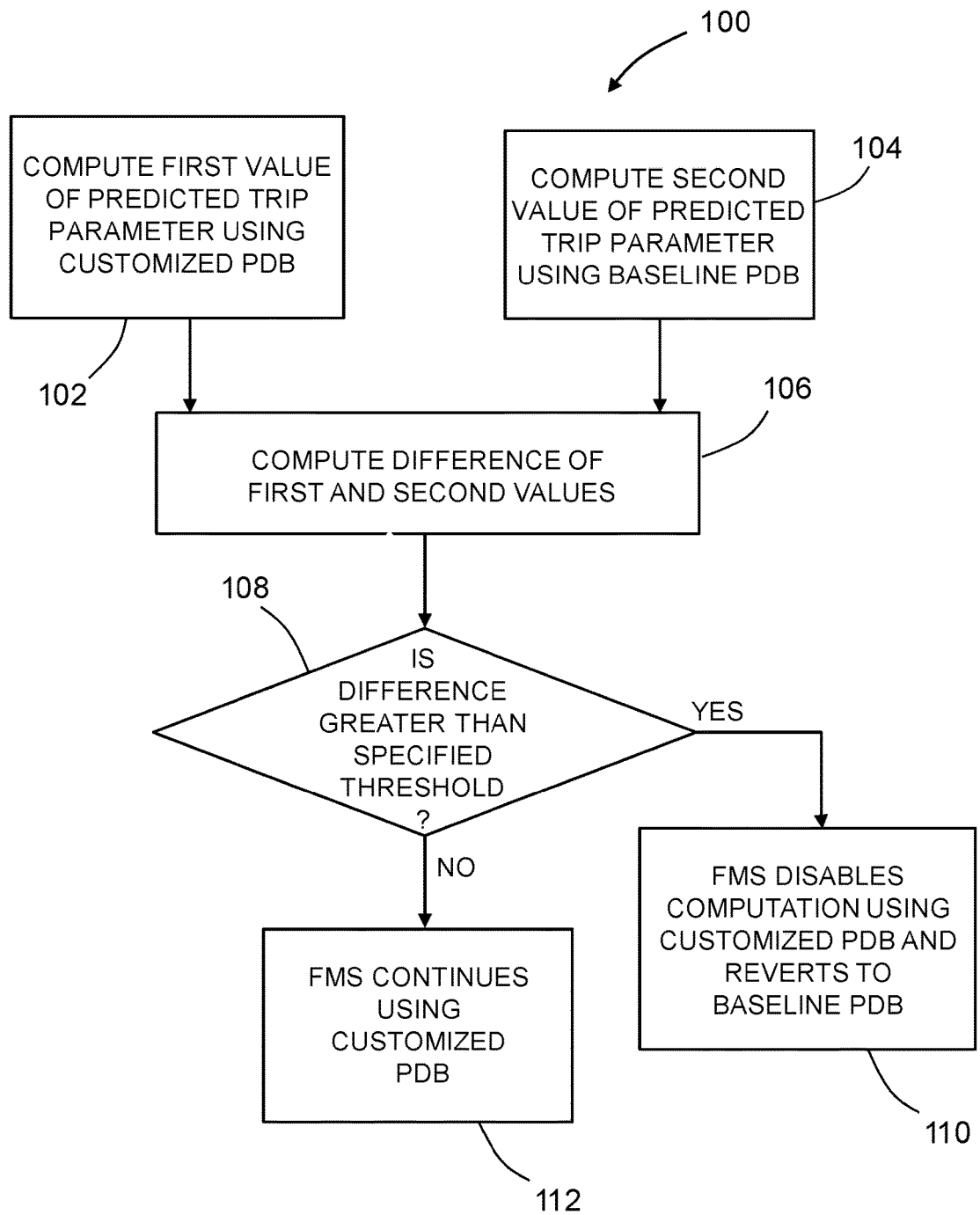
FIG. 9 is a flowchart listing steps of an automated method in accordance with one embodiment wherein the flight management system uses decision logic to determine whether to discontinue use of the customized performance database by a particular FMS performance function

FIG. 9 is a flowchart listing steps of an automated method 100 in accordance with one embodiment wherein the flight management system uses decision logic to determine whether to discontinue use of the customized performance database by a particular FMS performance function. It should be appreciated that the flowchart seen in FIG. 9 does not show the preliminary steps of storing a baseline performance database and a customized performance database 36 in a non-transitory tangible computer-readable storage medium onboard the airplane (e.g., a memory disposed in or associated with the flight management system). In accordance with one example, the baseline performance database comprises a first lookup table configured to output baseline performance data in response to input of at least one flight parameter value. The baseline performance data is a function of at least a baseline value of an airplane characteristic and the at least one flight parameter value. The customized performance database comprises a second lookup table configured to output customized performance data in response to input of the at least one flight parameter value, which customized performance data is a function of at least an airplane-specific or fleet-specific value of the airplane characteristic and the at least one flight parameter value. In contrast, the baseline performance database comprises a model-specific value of the airplane characteristic.

In the course of performing the method outlined in FIG. 9, the flight management system 10 calculates a first predicted value of the trip parameter of interest using the baseline performance data output from the first lookup table (step 102) and also calculates a second predicted value of the trip parameter using the customized performance data output from the second lookup table (step 104). Then the flight management system 10 calculates a difference of the first and second predicted values of the trip parameter (step 106) and compares that difference to a specified threshold (step 108).

On the one hand, if the flight management system 10 determines that the difference of the first and second predicted values of the trip parameter is greater than the specified threshold, the flight management system 10 disables computations using the customized performance database 36 and reverts to using the baseline performance database 30 (step 110). On the other hand, if the flight management system 10 determines that the difference of the first and second predicted values of the trip parameter is not greater than the specified threshold, the flight management system 10 continues computations using the customized performance database 36 (step 112).

In addition to the method steps identified in FIG. 9, method 100 may further comprise displaying (e.g., on the LCD screen 40 of the control display unit 14) alphanumeric symbology representing the predicted value of the trip parameter during the current flight of the airplane. In accordance with one embodiment, the displayed alphanumeric symbology represents the first predicted value of the trip parameter if the difference of the first and second predicted values of the trip parameter is greater than the specified threshold or represents the second predicted value of the trip parameter if the difference of the first and second predicted values of the trip parameter is not greater than the specified threshold.

Figure 10:
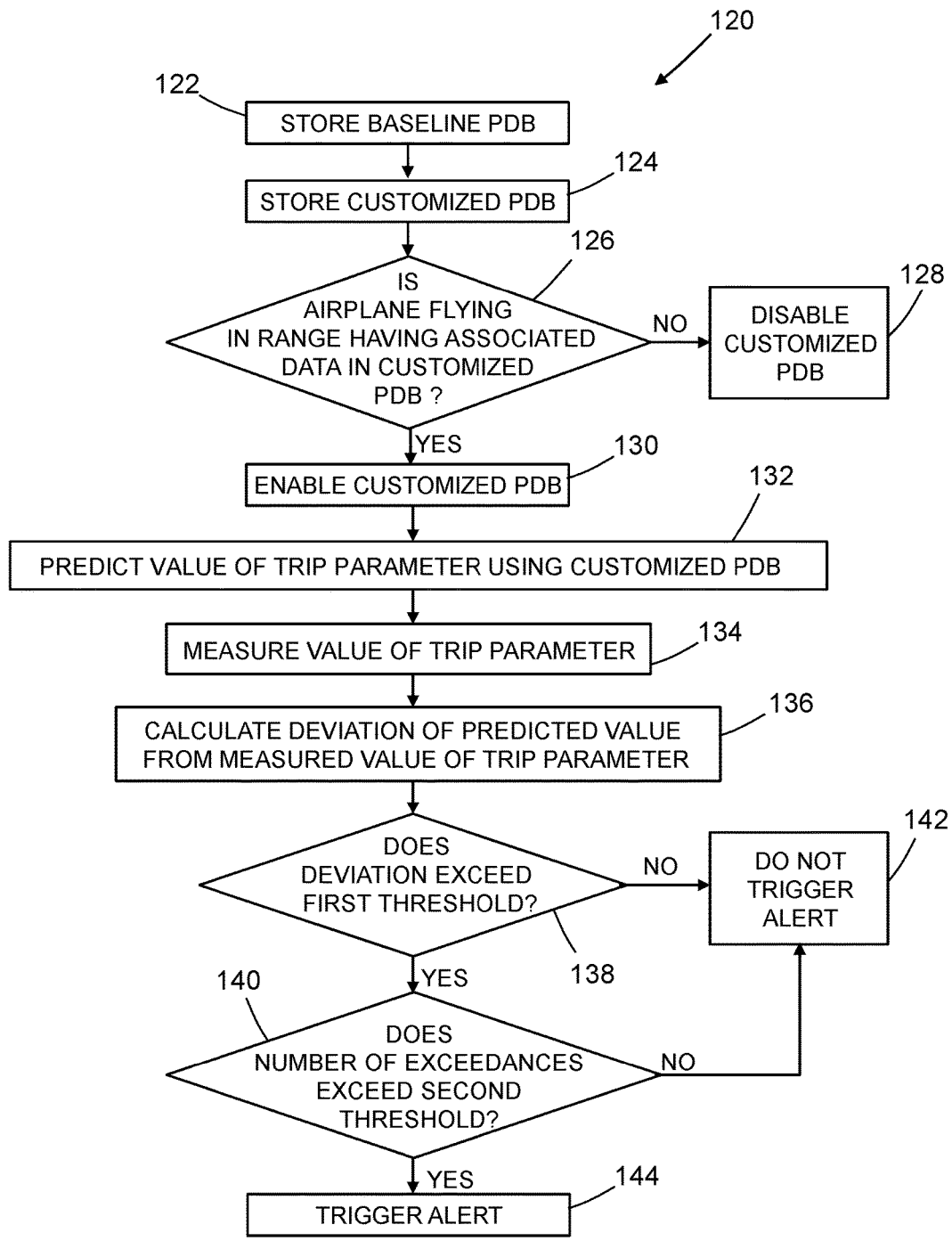
FIG. 10 is a flowchart listing steps of an automated method in accordance with one embodiment wherein the flight management system uses decision logic to determine whether to alert the pilot or the maintenance crew when the customized performance database needs to be replaced.

FIG. 10 is a flowchart listing steps of an automated method 120 in accordance with one embodiment wherein the flight management system uses decision logic to determine whether to alert the pilot or the maintenance crew when a customized performance database needs to be replaced. The concepts underpinning method 120 may be paraphrased by recitation of the following steps.

Preliminary steps include storing a baseline performance database 30 in a non-transitory tangible computer-readable storage medium onboard the airplane (step 122) and storing a customized performance database 36 in the same of a different non-transitory tangible computer-readable storage medium (step 124). Later the flight management system 10 makes a determination whether the airplane is flying within ranges of speed and altitude having associated updated data in the customized performance database 36 or not (step 126). On the one hand, if a determination is made in step 126 that the airplane is not flying within ranges of speed and altitude having associated updated data in the customized performance database 36, the customized performance database is disabled and not used (step 128). On the other hand, if a determination is made in step 126 that the airplane is flying within ranges of speed and altitude having associated updated data in the customized performance database 36, the customized performance database is enabled for use (step 130). Customized performance data is then retrieved from the customized performance database 36 and used to calculate a predicted value of the trip parameter (step 132). Optionally, first alphanumeric symbology may be displayed on a display unit in the flight deck during the current flight of the airplane, wherein the first alphanumeric symbology represents the predicted value of the trip parameter.

The method 120 may further comprise a routine or algorithm for alerting the pilot or the maintenance crew when the custom performance database 36 needs to be replaced. The flight management computer 12 uses the custom performance database 36 to predict values for various airplane-specific (a.k.a. tail-specific) performance/trip parameters such as maximum altitude, estimated time of arrival, fuel consumption, etc. However, if the flight management computer 12 detects that the airplane is consistently unable to achieve the predicted values (such as consistently missing the predicted estimated time of arrival by a certain threshold for previous flights), then the flight management computer 12 in accordance with some embodiments is configured to alert the pilot or the maintenance crew that the custom performance database 36 needs to be replaced with a newer version. The alert can be a recommended number of days or flights after which the database should be replaced. Or the alert can be a difference between the predicted values and the actual measured values of the trip parameters. For example, if the airplane is consistently late by five minutes, then this time difference is displayed on a CDU page to alert the pilot.

To illustrate the alert feature described in the preceding paragraph with reference again to FIG. 10, the method 120 may further comprise measuring a value of the trip parameter (step 134) using a measurement system and sending the measured value to the flight management system 10, which then calculates a magnitude of a deviation (i.e., the difference or delta) of the measured value of the trip parameter from the predicted value of the trip parameter (step 136). The flight management system 10 then determines whether the magnitude of the deviation exceeds a first specified threshold or not (step 138). On the one hand, if a determination is made in step 138 that the magnitude of the deviation does not exceed the first specified threshold, a pilot alert is not triggered (step 142). On the other hand, if a determination is made in step 138 that the magnitude of the deviation does exceed the first specified threshold, the flight management system 10 then determines whether the number of determinations that the magnitude of the deviation exceeded the first specified threshold exceeds a second specified threshold or not (step 140). Steps 134, 136 and 138 may be repeated during multiple flights of the airplane. On the one hand, if a determination is made in step 140 that the number of determinations that the magnitude of the deviation exceeded the first specified threshold does not exceed the second specified threshold, a pilot alert is not triggered (step 142). On the other hand, if a determination is made in step 140 that the number of determinations that the magnitude of the deviation exceeded the first specified threshold exceeds the second specified threshold, a pilot alert is triggered (step 144). Optionally second alphanumeric symbology is displayed on the display unit in response to a determination in step 140 that the number of determinations that the magnitude of the deviation exceeded the first specified threshold exceeded the second specified threshold, wherein the second alphanumeric symbology indicates that replacement of the customized performance database is warranted.

Figure 11:
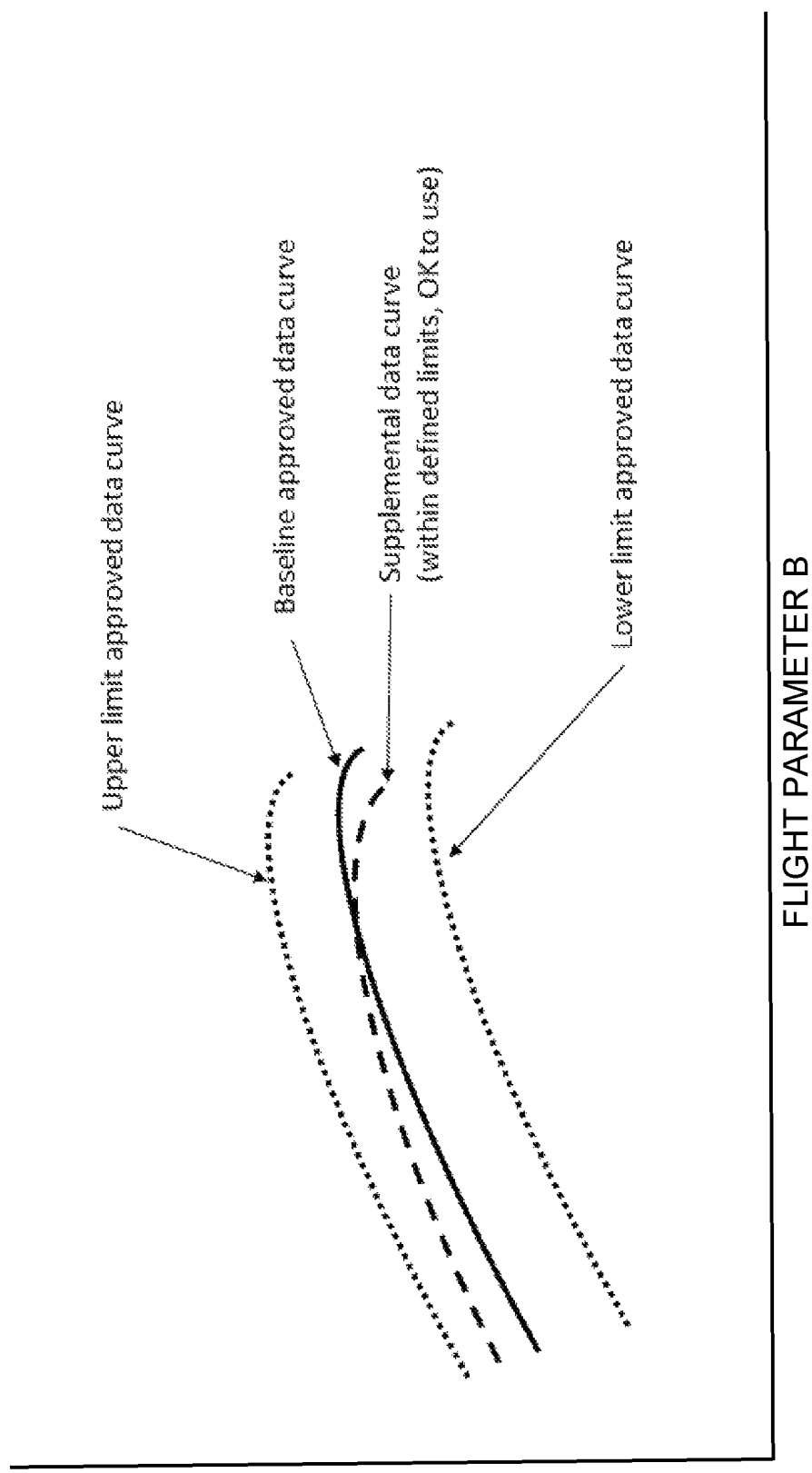
FIG. 11 is a graph showing various curves of a flight parameter A versus a flight parameter B, including an approved data curve stored in the baseline performance database, upper and lower limits relative to that the approved data curve, and a supplemental data curve (within the upper and lower limits) stored in the customized performance database.

As disclosed hereinabove, the flight management system 10 can be configured to receive a measured value of a trip parameter from a measurement system 48 and compare that measured value to the predicted value retrieved from or computed using data retrieved from the customized performance database 36. The flight management system 10 will continue to use the baseline performance database 30 as a "limit" on the numbers computed using the customized performance database 36. The same "limit" concept can be applied when the customized performance data is in curve format. FIG. 11 is a graph showing various curves of a flight parameter A versus a flight parameter B, including an approved data curve stored in the baseline performance database, upper and lower limits relative to that the approved data curve, and a supplemental data curve (within the upper and lower limits) stored in the customized performance database. For example, flight parameter A may be economy cruise speed while flight parameter B is the atmospheric parameter W/δ, where W is the gross aircraft weight and δ represents the ratio of the air stream pressure at a chosen reference station relative to sea level standard atmospheric conditions. When the flight management computer 12 detects that a trip parameter value computed using tables or curves from the customized performance database 36 exceeds an upper limit or lower limit of the baseline performance database 30, then the flight management computer 12 automatically disables the tables or curves in the customized performance database 36.

In accordance with a further embodiment of a flight management system 10, the updated performance tables or curves loaded into the customized performance tables 36 can be selectively applied to different phases of flight. The flight crew can specify a subset of the flight plan where the customized performance tables 36 are to be applied. This provides additional flexibility in the way the flight crew controls the airplane and further provides means for disabling the customized performance tables 36 and reverting to the baseline performance database 30 in case the flight crew detects an error in them. Also, it gives the flight crew an opportunity to see real-time performance differences that can be realized by using the updated performance tables or curves.

FIG. 12 is a diagram representing a CDU page named PERF PROGRESS that allows the flight crew to specify the start and end waypoints of a flight segment during which the selected customized airplane performance tables or curves may be used. The start and end waypoints may be in the same flight phase or different flight phases. In the example depicted in FIG. 12, the start waypoint is KBFI and the end waypoint is KMIA. Multiple flight segments can be specified on additional pages. The PERF PROGRESS CDU page also displays the relative performance differences realized by using the customized performance data tables during the flight segment specified by the start and end waypoints. In the example depicted in FIG. 12, the predicted fuel savings were 0.8%, the predicted average speed difference was 0.012, and the predicted average altitude difference was 300 feet.

The storing of up-to-date customized performance data tables and/or curves benefits the flight management system 10 by avoiding constant use of corrected data by the performance algorithms to compute updated predicted airplane performance values. In some cases, the correct predicted airplane performance values can simply be looked up in the customized performance data tables or curves, thus freeing up the FMS computing resources. This is also computationally efficient.

The flight crew can select to utilize the customized values right away to take advantage of the updated performance data tables/curves or wait until a later time. Thus the customized performance database 36 can be used for the current flight or can be stored in a non-transitory tangible computer-readable storage medium (e.g., memory) for later use on multiple flights until the flight or maintenance crew decides to delete or update it.

While systems and methods for using a customized performance database to calculate a flight profile and associated trip prediction parameters have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices comprising at least a processing unit (e.g., a central processing unit, an integrated circuit or an arithmetic logic unit) and a non-transitory tangible computer-readable storage medium.

The methods described herein may be encoded as executable instructions embodied in a non-transitory tangible computer-readable storage medium, including, without limitation, a storage device and/or a memory device. Such instructions, when executed by a processing or computing system, cause the system to perform at least a portion of the methods described herein.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A method for displaying a predicted value of a trip parameter onboard an airplane, comprising:
    (a) storing a baseline performance database in a non-transitory tangible computer-readable storage medium onboard the airplane, the baseline performance database comprising a first lookup table configured to output baseline performance data in response to input of at least one flight parameter value, which baseline performance data is a function of at least a baseline value of an airplane characteristic and the at least one flight parameter value;
    (b) storing a customized performance database in the same or a different non-transitory tangible computer-readable storage medium onboard the airplane, the customized performance database comprising a second lookup table configured to output customized performance data in response to input of the at least one flight parameter value, which customized performance data is a function of at least an airplane-specific or fleet-specific value of the airplane characteristic and the at least one flight parameter value;
    (c) calculating a first predicted value of the trip parameter using the baseline performance data output from the first lookup table;
    (d) calculating a second predicted value of the trip parameter using the customized performance data output from the second lookup table;
    (e) calculating a difference of the first and second predicted values of the trip parameter;
    (f) comparing the difference to a specified threshold; and
    (g) displaying alphanumeric symbology on a display unit in a flight deck during a current flight of the airplane, wherein the alphanumeric symbology represents the first predicted value of the trip parameter if the difference is greater than the specified threshold or the second predicted value of the trip parameter if the difference is less than the specified threshold.

2. The method as recited in claim 1, wherein at least steps (c) through (f) are performed by a flight management computer onboard the airplane.

3. The method as recited in claim 1, further comprising disabling the customized performance database for use if the difference is greater than the specified threshold.

4. The method as recited in claim 1, wherein the airplane characteristic is a drag coefficient or a fuel factor or speed/altitude ranges.

5. The method as recited in claim 1, wherein the baseline performance database comprises a model-specific value of the airplane characteristic.

6. The method as recited in claim 2, further comprising:
    (h) determining whether the customized performance database contains data associated with flight conditions applicable to the airplane or not; and
    (i) accepting the customized performance database for use if a determination is made that the customized performance database contains data associated with the flight conditions applicable to the airplane, wherein steps (h) and (i) are performed by the flight management computer onboard the airplane.

7. A method for displaying a predicted value of a trip parameter onboard an airplane, comprising:
    (a) storing a baseline performance database in a non-transitory tangible computer-readable storage medium onboard the airplane, the baseline performance database comprising a first lookup table configured to output baseline performance data in response to input of at least one flight parameter value, which baseline performance data is a function of at least a baseline value of an airplane characteristic and the at least one flight parameter value;
    (b) storing a customized performance database in the same or a different non-transitory tangible computer-readable storage medium onboard the airplane, the customized performance database comprising a second lookup table configured to output customized performance data in response to input of the at least one flight parameter value, which customized performance data is a function of at least an airplane-specific or fleet-specific value of the airplane characteristic and the at least one flight parameter value;
(c) determining whether the airplane is flying within ranges of speed and altitude having associated updated data in the customized performance database or not;
(d) enabling the customized performance database for use if a determination is made in step (c) that the airplane is flying within ranges of speed and altitude having associated updated data in the customized performance database;
(e) retrieving the customized performance data while the customized performance database is enabled;
(f) calculating a predicted value of the trip parameter using the customized performance data retrieved from the customized performance database; and
(g) displaying first alphanumeric symbology on a display unit in a flight deck during a current flight of the airplane, wherein the first alphanumeric symbology represents the predicted value of the trip parameter.

8. The method as recited in claim 7, wherein steps (c) through (f) are performed by a flight management computer onboard the airplane.

9. The method as recited in claim 7, further comprising disabling the customized performance database for use if a determination is made in step (c) that the airplane is not flying within ranges of speed and altitude having associated updated data in the customized performance database.

10. The method as recited in claim 7, further comprising:
(h) measuring a value of the trip parameter to produce a measured value of the trip parameter;
(i) calculating a magnitude of a deviation of the measured value of the trip parameter from the predicted value of the trip parameter;
(j) determining whether the magnitude of the deviation exceeds a first specified threshold or not;
(k) repeating steps (h) through (j) during multiple flights;
(l) determining whether the number of determinations that the magnitude of the deviation exceeded the first specified threshold exceeds a second specified threshold or not; and
(m) displaying second alphanumeric symbology on the display unit in response to a determination in step (l) that the number of determinations that the magnitude of the deviation exceeded the first specified threshold exceeds the second specified threshold, wherein the second alphanumeric symbology indicates that replacement of the customized performance database is warranted.

11. The method as recited in claim 7, wherein the airplane characteristic is a drag coefficient or a fuel factor or speed/altitude ranges.

12. The method as recited in claim 7, wherein the baseline performance database comprises a model-specific value of the airplane characteristic.

13. A method for displaying a predicted value of a trip parameter onboard an airplane, comprising:
(a) storing a baseline performance database in a non-transitory tangible computer-readable storage medium onboard the airplane, the baseline performance database comprising a first lookup table configured to output baseline performance data in response to input of at least one flight parameter value, which baseline performance data is a function of at least a baseline value of an airplane characteristic and the at least one flight parameter value;
(b) storing a customized performance database in the same or a different non-transitory tangible computer-readable storage medium onboard the airplane, the customized performance database comprising a second lookup table configured to output customized performance data in response to input of the at least one flight parameter value, which customized performance data is a function of at least an airplane-specific or fleet-specific value of the airplane characteristic and the at least one flight parameter value;
(c) determining whether the customized performance database contains data associated with an obsolete configuration of the airplane or not;
(d) enabling the customized performance database for use if a determination is made in step (c) that the customized performance database does not contain data associated with the obsolete configuration of the airplane;
(e) retrieving the customized performance data while the customized performance database is enabled;
(f) calculating a predicted value of the trip parameter using the customized performance data retrieved from the customized performance database; and
(g) displaying alphanumeric symbology on a display unit in a flight deck during a current flight of the airplane, wherein the alphanumeric symbology represents the predicted value of the trip parameter.

14. The method as recited in claim 13, further comprising triggering a pilot warning if a determination is made in step (c) that the customized performance database contains data associated with the obsolete configuration of the airplane.

15. A system for displaying a predicted value of a trip parameter onboard an airplane, comprising a display unit and a computer system configured to perform the following operations:
(a) store a baseline performance database in a non-transitory tangible computer-readable storage medium onboard the airplane, the baseline performance database comprising a first lookup table configured to output baseline performance data in response to input of at least one flight parameter value, which baseline performance data is a function of at least a baseline value of an airplane characteristic and the at least one flight parameter value;
(b) store a customized performance database in the same or a different non-transitory tangible computer-readable storage medium onboard the airplane, the customized performance database comprising a second lookup table configured to output customized performance data in response to input of the at least one flight parameter value, which customized performance data is a function of at least an airplane-specific or fleet-specific value of the airplane characteristic and the at least one flight parameter value;
(c) determine whether the airplane is flying within ranges of speed and altitude having associated updated data in the customized performance database or not;
(d) enable the customized performance database for use if a determination is made in step (c) that the airplane is flying within ranges of speed and altitude having associated updated data in the customized performance database;
(e) retrieve the customized performance data while the customized performance database is enabled;
(f) calculate a predicted value of the trip parameter using the customized performance data retrieved from the customized performance database; and
(g) control the display unit to display first alphanumeric symbology on a display unit in a flight deck during a current flight of the airplane, wherein the first alphanumeric symbology represents the predicted value of the trip parameter.

16. The system as recited in claim 15, wherein the computer system is further configured to disable the customized performance database for use if a determination was made in operation (c) that the airplane is not flying within ranges of speed and altitude having associated updated data in the customized performance database.

17. The system as recited in claim 15, further comprising a measurement system configured to measure the trip parameter during flight of the airplane to produce a measured value of the trip parameter, wherein the computer system is further configured to perform the following operations:
 (h) receive the measured value of the trip parameter from the measurement subsystem;
 (i) calculate a magnitude of a deviation of the measured value of the trip parameter from the second predicted value of the trip parameter;
 (j) determine whether the magnitude of the deviation exceeds a first specified threshold or not;
 (k) repeat steps (h) through (j) during multiple flights;
 (l) determine whether the number of determinations that the magnitude of the deviation exceeded the first specified threshold exceeds a second specified threshold or not; and
 (m) control the display unit to display second alphanumeric symbology in response to a determination in operation (k) that the number of determinations that the magnitude of the deviation exceeded the first specified threshold exceeds the second specified threshold, wherein the second alphanumeric symbology indicates that replacement of the customized performance database is warranted.

18. The method as recited in claim 7, further comprising:
 calculating a first predicted value of the trip parameter using baseline performance data output from the first lookup table;
 calculating a second predicted value of the trip parameter using customized performance data output from the second lookup table;
 calculating a difference of the first and second predicted values of the trip parameter;
 comparing the difference to a specified threshold; and
 displaying alphanumeric symbology on the display unit in the flight deck during the current flight of the airplane, wherein the alphanumeric symbology represents the first predicted value of the trip parameter if the difference is greater than the specified threshold or the second predicted value of the trip parameter if the difference is less than the specified threshold.

19. The method as recited in claim 18, further comprising:
 determining prior to flight whether the customized performance database contains data associated with an obsolete configuration of the airplane or not; and
 enabling the customized performance database for use if a determination is made prior to flight that the customized performance database does not contain data associated with the obsolete configuration of the airplane.

20. The method as recited in claim 7, further comprising:
 determining prior to flight whether the customized performance database contains data associated with an obsolete configuration of the airplane or not; and
 enabling the customized performance database for use if a determination is made prior to flight that the customized performance database does not contain data associated with the obsolete configuration of the airplane.

* * * * *